March 26, 1968    J. L. REYNOLDS, JR    3,374,717
POWER FLOAT
Filed June 27, 1966

INVENTOR.
John L. Reynolds Jr.
BY
Wayne Lang
AGENT

3,374,717
POWER FLOAT
John L. Reynolds, Jr., R.D. 1, Portville, N.Y. 14770
Filed June 27, 1966, Ser. No. 560,416
7 Claims. (Cl. 94—45)

This apparatus relates generally to leveling apparatus and more specifically to portable leveling apparatus that is adapted for the attachment to the power take-off of a tractor or other rotary source of power for the express use of leveling concrete or the like without the necessity of first positioning screeds on the ground or other surface to be covered with concrete to the proper level to which the concrete is to be laid.

The leveling of concrete usually requires the advance positioning of screeds or forms on the surface to be covered with concrete to delineate the levels to which the concrete is to be formed. This prerequisite is time consuming and expensive to effect, and it requires the necessity of a most uncomfortable type of work that is slow to perform and still subject to numerous errors.

An object of this invention therefore is to provide an attachment for tractors or the like which precludes the requirement for pre-set screeds on the ground by the provision of all leveling arrangements on or above the apparatus of the invention.

Another object of this invention is to provide a flexible unit that may be readily moved laterally to avoid obstacles that may be present without the necessity of adhering to a fixed track or pattern.

Still another object of my invention is to provide a mechanical leveling apparatus of the type defined that requires but a single operator.

With these objects in view, this invention will be more apparent after consideration of the novel features of construction as particularly pointed out in the specification and shown in the drawings in which.

Figure 1:
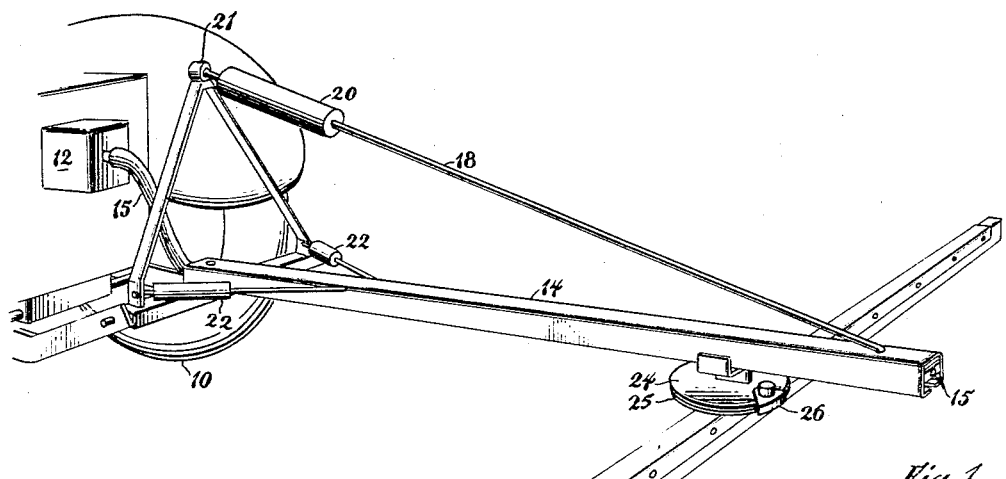
FIGURE 1 is a perspective view of the device of the invention properly positioned on a tractor as a positioning agent and a rotative source of power.

In the drawings there is illustrated a conventional rotary source of power exemplified by a tractor 10 with a power takeoff 12 that is connected to a boom means 14 having a screw means 15 rotated therein in response to rotation of power takeoff 12. Other means such as an endless belt could easily be substituted for the screw means 15 to transmit rotational power from the power take-off to the end of the boom, but such means are not here shown only as a matter of convenience.

The boom 14 is supported outwardly of the tractor 10 and swivel joint 21 by a support 18 which may be shortened or extended by one or more hydraulic controls 20 to raise or lower boom 18 to a predetermined level substantially parallel to the level of the surface to be covered with concrete.

A transverse float 16 and gear means 25 is carried by the boom 14 and is adapted to be moved axially thereof in response to rotation of the screw means within the boom 14 and the power takeoff.

Figure 3:
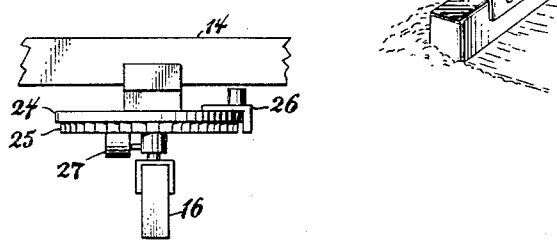
FIGURE 3 is a partial side view of the apparatus showing the float attachment to the boom.
Figure 2:
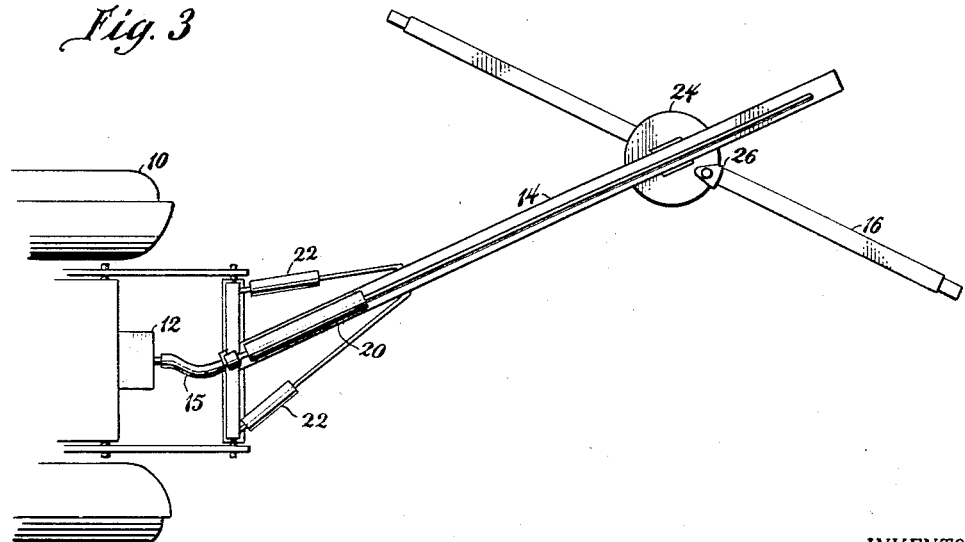
FIGURE 2 is a top plan view of the device of the invention extended to one side.

The boom 14 may be moved clockwise or counterclockwise from the tractor 10 or other support by hydraulic actuators 22. A still further control for the float 16 is to be found in the clockwise or counter-clockwise rotation of the float in response to rotation of the gear means 25 axially aligned therewith. The gear means is moved clockwise or counter-clockwise in response to actuation of a reversible motor 26 on the upper side of plate 24 as seen in FIGURE 3.

The circular plate 24 supports gear means 25 which receives its driving force from an electric motor 26 having its source of power, for example, back at the tractor where it may be served by the operator in charge of the tractor 10.

Another electric motor 27 on relatively fixed plate 24 drives a vibrator to translate rotational movement of motor 27 into horizontal movement of float 16 so that the float is agitated continuously during operation.

In operation the boom is supported outwardly of the tractor by the support means 18. A float 16 is supported from the boom and moved axially thereof in response to rotation of the screw means 15 and the power take-off 12. As the float is moved longitudinally on the boom 14 by the power take-off it is also agitated continuously by the motor 27 and agitator connected thereto. The continuous agitation, preferably in a horizontal position tends to break down the resistance the concrete has to movement of the float with reference to its surface.

Movement of float 16 around obstacles or in hard-to-reach places is effected by clockwise or counter-clockwise movement of the boom and/or the float.

While the power float of my invention has been described as being used with a tractor, it will be understood that the device is not to be so limited inasmuch as it may be properly used with any suitable source of rotative power.

Various modifications of the device illustrated and described in the foregoing specification and drawings may be resorted to without departure from the spirit and scope of the invention. It is intended that such changes may be made in the structure of my power float without departing from the inventive principle disclosed herein.

What I claim is:

1. An apparatus for placing a surface on plastic concrete or the like to be attached to a rotatable source of power comprising boom means extending from the source of power in the direction of the surface to be attained by the concrete, float means carried by said boom means adapted to be moved substantially parallel thereto, means moving said float means along the longitudinal axis of said boom means in response to movement of the rotatable source of power, means for agitating said float means as it is moved along the axis of said boom, and means above the surface of said float means supporting said boom means in a predetermined position.

2. Apparatus for smoothing the surface of concrete or the like as defined in claim 1 whereby said means moving said float means along said boom means lies within said boom means.

3. Apparatus for smoothing the surface of concrete or the like as defined in claim 1 wherein said boom means extends substantially parallel to the surface to be attained by said concrete.

4. Apparatus for smoothing the surface of concrete or the like as defined in claim 1 wherein said means for agitating said float means moves it in a direction which crosses the axis of said boom means.

5. Apparatus for smoothing the surface concrete or the like as defined in claim 1 wherein the means above the surface of the concrete supporting said float means includes other means for regulating the elevation thereof.

6. Apparatus for smoothing the surface of concrete or the like as defined in claim 1 having means moving said float means clockwise and counter-clockwise around said boom.

7. Apparatus for smoothing the surface of concrete or the like as defined in claim 1 wherein said float means is balanced equally on opposite sides of said boom means.

References Cited

UNITED STATES PATENTS

| 2,746,366 | 5/1956 | Reed | 94—45 |
| 3,216,338 | 11/1965 | Madsen | 94—45 |

CHARLES E. O'CONNELL, *Primary Examiner.*

N. C. BYERS, *Assistant Examiner.*